(12) United States Patent
Xia

(10) Patent No.: US 12,065,292 B2
(45) Date of Patent: Aug. 20, 2024

(54) FOLDING AND INTERLOCK STRUCTURES FOR REUSABLE AND COLLAPSIBLE BOXES

(71) Applicant: Qun Xia, Weston, FL (US)

(72) Inventor: Qun Xia, Weston, FL (US)

( * ) Notice: Subject to any disclaimer, the term of this patent is extended or adjusted under 35 U.S.C. 154(b) by 0 days.

(21) Appl. No.: 17/616,773

(22) PCT Filed: Nov. 23, 2019

(86) PCT No.: PCT/US2019/062880
§ 371 (c)(1),
(2) Date: Dec. 6, 2021

(87) PCT Pub. No.: WO2020/251616
PCT Pub. Date: Dec. 17, 2020

(65) Prior Publication Data
US 2022/0388713 A1  Dec. 8, 2022

(51) Int. Cl.
*B65D 5/26* (2006.01)
*B65D 5/66* (2006.01)

(52) U.S. Cl.
CPC ............ *B65D 5/26* (2013.01); *B65D 5/6632* (2013.01); *B65D 2301/20* (2013.01)

(58) Field of Classification Search
CPC .............................. B65D 5/26; B65D 5/6632
USPC ................................ 229/143, 193–194, 149
See application file for complete search history.

(56) References Cited

U.S. PATENT DOCUMENTS

| | | | | |
|---|---|---|---|---|
| 289,790 A * | 12/1883 | Wilcox | ................ | B65D 5/6661 |
| | | | | 229/148 |
| 1,894,226 A * | 1/1933 | Ross | ........................ | B65D 5/26 |
| | | | | 229/160 |
| 2,169,065 A * | 8/1939 | Cole | ........................ | B65D 5/26 |
| | | | | 229/148 |
| 2,493,176 A * | 1/1950 | Whitehead | ........... | B65D 5/6632 |
| | | | | 229/149 |

(Continued)

FOREIGN PATENT DOCUMENTS

| | | | | |
|---|---|---|---|---|
| CH | 175832 A | * | 3/1935 | |
| CN | 108408190 A | * | 8/2018 | |
| FR | 2716667 A1 | * | 9/1995 | ............... B65D 5/26 |

OTHER PUBLICATIONS

Espacenet Machine Translation of FR2716667A1 Description (Year: 1995).*

*Primary Examiner* — Nathan J Newhouse
*Assistant Examiner* — Phillip D Schmidt
(74) *Attorney, Agent, or Firm* — Mark C. Johnson; Johnson Dalal

(57) ABSTRACT

Plastic corrugated reusable boxes are provided. Two opposite side panels 12 erected from a blank over fold lines 18 at bottom panel edges; said side panel 12 having flaps 20 attached on either side folded inward and interlocked with flaps 22 folded inward from the opposite side. Narrow flaps 32 attached to top edges of said side panels 12 folded inward and flat. The rest two opposite side panels 14 erected over fold lines at rest bottom panel edges; top flaps 30 attached to the rest two side panels 14 folded inward covering the top surface. Interlocked flaps 20 and 22 are standing underneath top flaps 30 and alongside two opposite side panels 14. Lock tabs 40 attached to top flaps 20 folded down and inserted into said lock slots embedded in narrow flaps 22 alongside side panels 12 top edges.

8 Claims, 3 Drawing Sheets

(56) References Cited

U.S. PATENT DOCUMENTS

| | | | | |
|---|---|---|---|---|
| 2,782,980 A | * | 2/1957 | Rueckert | B65D 5/6626 |
| | | | | 229/245 |
| 3,361,324 A | * | 1/1968 | Crisafulli | B65D 5/48016 |
| | | | | 229/149 |
| 4,339,069 A | * | 7/1982 | Poteet | B65D 5/26 |
| | | | | 229/117.17 |
| 2008/0023533 A1 | * | 1/2008 | Chang | B65D 5/46104 |
| | | | | 229/117.14 |
| 2011/0136641 A1 | * | 6/2011 | Lee | B65D 5/6655 |
| | | | | 493/162 |
| 2013/0193197 A1 | * | 8/2013 | Low | B65D 5/6691 |
| | | | | 229/146 |

* cited by examiner

FOLDING AND INTERLOCK STRUCTURES FOR REUSABLE AND COLLAPSIBLE BOXES

BACKGROUND—PRIOR ART

The following is tabulation of some prior art that presently appears relevant:

U.S. Patents

| Patent Number | Kind Code | Issue Date | Patentee |
|---|---|---|---|
| U.S. Pat. No. 3,519,190 | 229-37 | Jul. 7, 1970 | Achermann |
| U.S. Pat. No. 4,360,106 | 206/621 229/44 | Nov. 23, 1982 | Irvine |
| U.S. Pat. No. 5,002,221 | 229/120 | Mar. 26, 1991 | Ragan |
| U.S. Pat. No. 5,209,392 | 229/117,01 | May 11, 1993 | Anatro |
| U.S. Pat. No. 5,295,632 | 229/23 | Mar. 22, 1994 | Zink |
| U.S. Pat. No. 5,325,602 | 34/287 | Jul. 5, 1994 | Nainis |
| U.S. Pat. No. 5,429,261 | 229/117,07 | Jul. 4, 1995 | Machino |
| U.S. Pat. No. 5,887,782 | 229/183 | Mar. 30, 1999 | Mueller |
| U.S. Pat. No. 5,996,885 | 229/177 | Dec. 7, 1999 | Chu |
| U.S. Pat. No. 6,102,279A | 229/155 | Aug. 15, 2000 | Dowd |
| U.S. Pat. No. 7,051,919B1 | 229/103 | May 30, 2006 | Walsh |
| U.S. Pat. No. 8,864,017B | 2229/198.2 | Oct. 21, 2014 | McMahon |

U.S. Patent Application Publications

| Publication Nr. | Kind Code | Publ. Date | Applicant |
|---|---|---|---|
| US 2003/0234283 A1 | 229/117.17 | Dec. 25, 2003 | Dowd |
| US 2017/0369221 A1 | B65D 77/22 | Dec. 28, 2017 | Balazs |
| US 2005/0006446A1 | 229/117.04 | Jan. 13, 2005 | Stafford, JR. |

Foreign Patent Documents

| Foreign Doc. Nr. | Cntry Code | Kind Code | Pub. Dt | App or Patentee |
|---|---|---|---|---|
| EP1693304B1 | EP | B65D 6/22 | May 14, 2008 | VARGAS |
| WO2003/031271 | WO | B65D 5/42 | Apr, 17, 2003 | Sato |
| CN 204606462 U | CN | B65D 6/32 | Sep. 2, 2015 | Teng |
| CN 204822361 U | CN | B65D 6/24 | Dec. 2, 2015 | Huang |
| CN 208264803 U | CN | B65D 6/18 | Dec. 21, 2018 | Zhao |
| CN 204979521 U | CN | B65D 6/16 | Jan. 20, 2016 | Yuan |

FIELD OF THE INVENTION

The present invention relates to reusable and collapsible plastic corrugated boxes that are capable of being assembled to a box from flat plastic corrugated blank, serving purposes of both shipping packages and storage. After use, the boxes are capable of being easily dissembled to flat blanks or even inward collapsed to keep until the next time use.

Using sustainable and particularly the reusable packaging is one of the most tangible and effective zero waste measures in the circular economy to fight climate change. Decreasing the single use cardboard boxes in a large number will cut down the carbon foot print and solid wastes in landfill, reduce consumptions on natural resources and emit less pollutions. Inefficiency in cardboard recycling and reprocessing can be significantly transformed by box return, reuse and circulation.

The booming eCommerce boosts the use and production of cardboard boxes to 100 billion in the US along annually, which generates environmental impact and eco concerns. The present invention relates to the theme of reusable alternative to cardboard boxes, aiming to meet box reuse needs for individual consumers, B2B supply chains, retailers and eCommerce. The present invention provides innovative structural features for the strength of reusable boxes, to be light in weight, user friendly to gain consumer experiences in simplicity and satisfaction, particularly addressing on design features to be packaging equipment friendly to be easily and quickly incorporated into the packaging and automation processes at fulfillment centers or distribution centers.

Manufacturing costs on reusable and collapsible plastic corrugated boxes are of great concerns even though these boxes will save money after reuse time to time. The present invention allows one time die cutting and fold line crushing on one piece of plastic corrugated blank which is in restrictive area to limit material waste by cutaways. It simplifies procedures in production thus minimizing the costs.

Unlike the simple one piece folder embodiment in the present invention, one drawback to boxes described in U.S. Pat. Nos. 6,102,279A, 5,325,602, US 2003/0234283 A1, U.S. Pat. No. 5,887,782, CN 204979521 U is that the bottom panels have to be complicatedly assembled before erecting the box panels and completing the enclosure. Use of accessories such as springs, guide tracks, buckles or even Velcro strips etc. is another type of complication on reusable boxes that have been introduced in CN 204822361 U. Heavy self-locking top rail and top rail described in U.S. Pat. Nos. 5,295,632 and 5,429,261 to hold side panels up and stand the boxes, increase the box weight.

Boxes described in U.S. Pat. No. 8,864,017 B and WO2003/031271 are in conventional four side panel designs and each side panel has a rectangular flap attached on the top and a rectangular flap attached at the bottom. There are no lock tabs or features to lock the top or bottom flaps at the top or bottom surfaces for plastic corrugated sheet with folding elasticity.

Many box designs provide insufficient or no interlock or locking structures between opposite side panels in boxes such as those described in U.S. Pat. Nos. 4,360,106, 5,002,221 and 5,209,392, sacrificing the strength of the boxes to take heavy loads. Flap and tab tuck in designs on side panels by folding up and then down described in U.S. Pat. No. 5,996,885 generate many over layers and are not packaging equipment friendly.

SUMMARY OF THE INVENTION

The present invention relates to reusable plastic corrugated boxes. The boxes are formed from flat blanks of extruded plastic through die cut to designed patterns with fold lines created by crushing, scoring or heat melting or welding. Opposite side panels are folded upward to form box walls, flaps attached to opposite side panels over fold lines are folded inward to interlock alongside the other opposite side walls. The interlocked flaps are topped by a top flap or top flaps which close the top opening completely or partially. The tabs, flaps and panels are attached to each other over fold lines.

The reusable boxes are made of plastic corrugated blank which is extruded plastic with double outer layers and a plurality of flutes between the two outer layers longitudinally along the extrusion direction or in various flute layout patterns. The present invention describes the embodiment of reusable boxes made of fluted plastic blanks; no flute openings are visible from above, minimizing contaminations from falling into the flutes.

A variety of means can be used with respect to interlocking the flaps from the opposite sides of boxes. It could be by inserting a tab attached to one flap into a slot embedded in the opposite flap; or mutual insert by vertical or horizontal tabs attached to flaps from opposite sides. Interlocked flaps stand inside and alongside the other opposite side panels.

The procedures of assembling the boxes start from folding up the opposite side panels over the fold lines at bottom panel edges, further folding the attached flaps inward and all the way inside unformed box until the tab attached to one flap pointing to the slot embedded in the opposite flap, inserting the tab into the slot to interlock, then folding elasticity on the plastic corrugated sheet between the flaps and side panels will pull back the interlocked flaps from inside to the box sides and close the rest two box sides. The flap interlocks at the mean time hold down the upward move tendency caused by folding elasticity between opposite side panels and the bottom panel, forming an enclosure among the bottom panel, opposite side panels and rest two side interlocked flaps. At this stage, the loading can be carried out. The present invention allows loading and holding single or assorted items in the enclosure before closing the top. At fulfillment centers, it saves the procedures of collecting assorted items into a plastic tote, then transferring into a cardboard box before shipping.

The next step is to erect the rest two opposite side panels and fold over the top flaps to close the top. The interlocked flaps are under the top flaps and alongside the rest opposite side panels, additionally supporting the rest opposite side panels of the box. In reverse, the closed top flaps press on the interlocked flaps, stabilizing the flap interlocks at the positions inside and alongside the rest opposite side panels, minimizing interruptions to the contents in the box.

In addition to the reusable box assembly and closing processes, lock tabs are attached on the sides of top flaps. Fold lock tabs downward over fold lines and insert into lock slots embedded on the narrow flaps. All interlock and lock mechanism are based on the tabs insert or mutual insert engagement and frictions, mutually blocking self-moving tendencies on interlocked flaps and locked tabs to be stabilized for the closed box structure.

Disassembly of the boxes start from withdrawing lock tabs from lock slots and lifting top flaps, pushing interlocked flaps inward until interlock tabs are withdrawn from interlock slots, the boxes are flattened or folded collapsible for storage without taking much space until the next time use. For shipping packages or storing stuff inside, packing tapes are always needed to seal the seams on the top or additionally taping across the exterior vertical corner seams to furthermore secure the reusable plastic corrugated boxes. Removing packing tapes won't damage the plastic corrugated box surface integrity which is a major benefit for the box reuse many times.

BRIEF DESCRIPTION OF THE DRAWINGS—FIGURES

Figure 1:
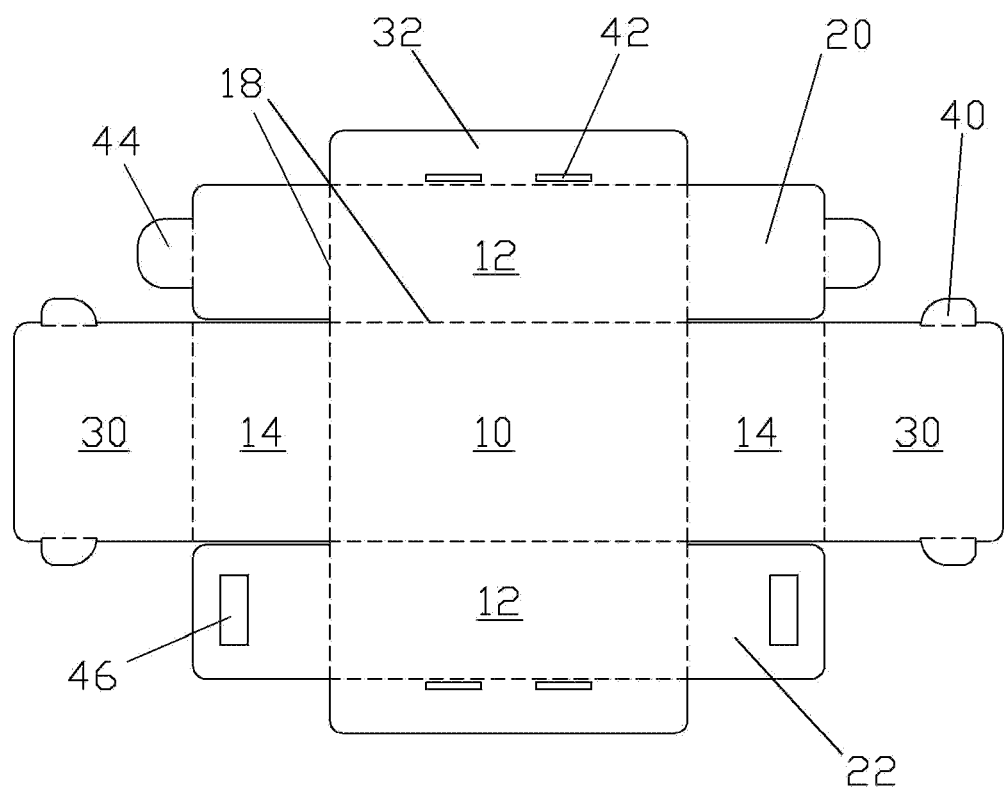
FIG. 1 is a plan view of a plastic corrugated blank having fold lines, slots, tabs, flaps and panels of an embodiment of the present invention.

| Drawing-Reference Numerals | |
|---|---|
| 10 | bottom panel |
| 12 | long side panel |
| 14 | short side panel |
| 18 | fold line |
| 20 | side flap with tab |
| 22 | side flap with slot |
| 30 | top flap |
| 32 | narrow flap |
| 40 | lock tab |
| 42 | lock slot |
| 44 | interlock slot |
| 46 | interlock slot |

DETAILED DESCRIPTION OF THE INVENTION

One embodiment of my reusable plastic corrugated boxes is illustrated in FIG. 1. Bottom panel 10 is located in the center of the die cut blank. Each of long side panels 12 is attached to opposite sides of bottom panel 10 over fold line 18, also further attached with a narrow flap 32 having lock slots 42. One long side panel 12 is attached with two side flaps 20 having interlock tabs 44, while the opposite long side panel 12 is attached with two side flaps 22 embedded with interlock slots 46. Short side panels 14 are attached to the other opposite sides of bottom panel 10 over fold lines 18, also further attached with top flaps 30 having lock tabs 40.

Figure 2:
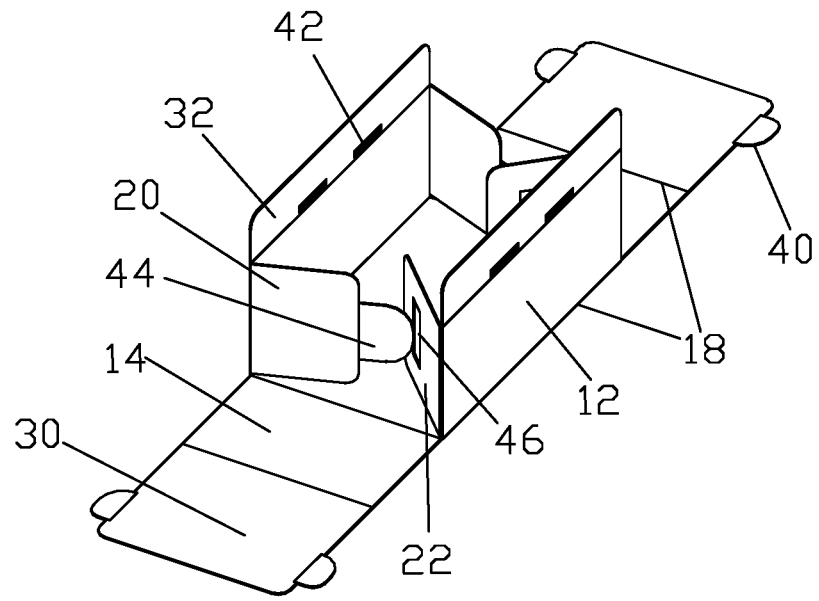
FIG. 2 is a partially erected plastic corrugated box with side flaps pushed inward with tabs pointing to slots embedded in flaps attached to the opposite long side panels.

FIG. 2 illustrates that long side panels 12 are erected over fold lines 18; each attached side flap with tab 20 and each attached side flap with slot 22 are folded inward over fold lines 18, all the way until getting inside space of the unformed box when each interlock tab 44 is pointing to each interlock slot 46.

Figure 3:
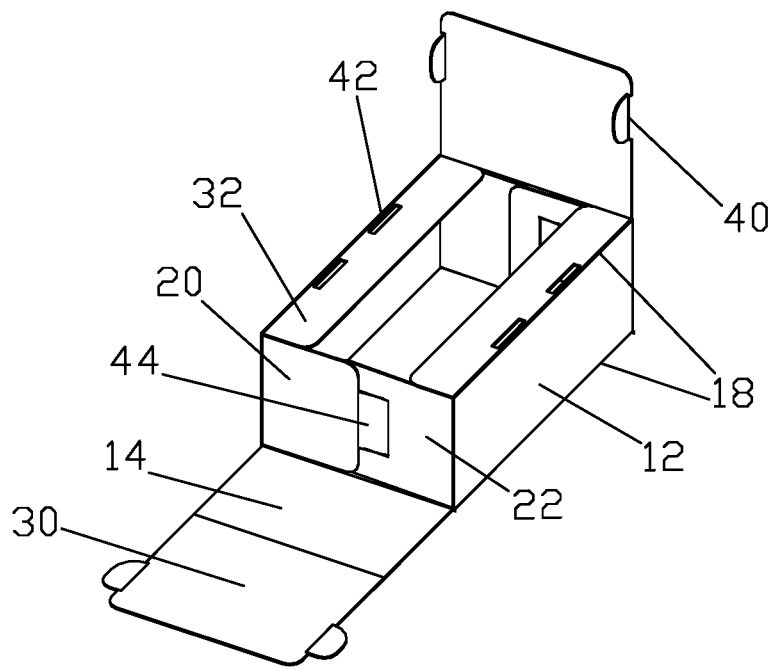
FIG. 3 is a partially erected plastic corrugated box with interlocked flaps pulled back to the sides by folding elasticity, folding down the narrow flaps and erecting one short side panel.

FIG. 3 illustrates that after inserting lock tabs 40 into lock slots 42, folding elasticity on the plastic corrugated sheet between side flaps (20 and 22) and long side panels 12 pulls back the interlocked flaps (20 and 22) from inside space to the box sides and close the rest two box sides. The flap interlocks meanwhile hold down the upward move tendency caused by folding elasticity between long side panels 12 and the bottom panel 10, forming an enclosure among the bottom panel 10, opposite long side panels 12 and interlocked rest two side flaps (20 and 22). At this stage, the loading can be carried out.

Narrow flaps 32 attached to long side panels 12 are folded flat and lock slots 42 are facing upward. Right outside of interlocked flaps (20 and 22), one short side panel 14 and attached top flap 30 are erected over fold lines 18 while attached lock tabs 40 are folded forward and ready to insert into lock slots 42.

Figure 4:
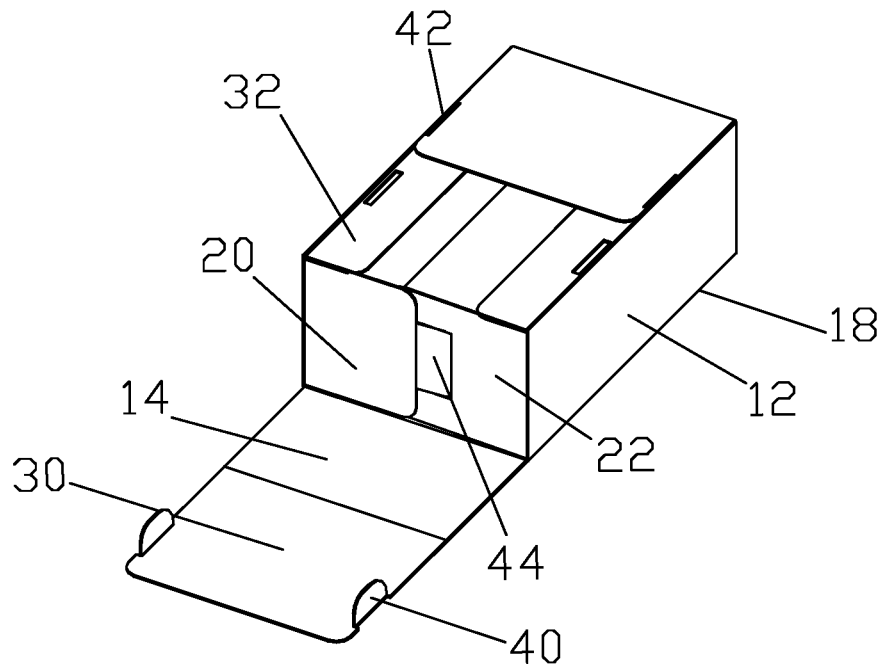
FIG. 4 is a partially closed plastic corrugated box by folding one top flap attached to the short side panel and inserting lock tabs into lock slots.

FIG. 4 discloses that one top flap 30 is folded down over fold lines 18 on top of narrow flaps 32, attached lock tabs 40 are also inserted into lock slots 42 underneath the top flap 30. Interlocked side flaps (20 and 22) are holding the position at the box side.

Figure 5:
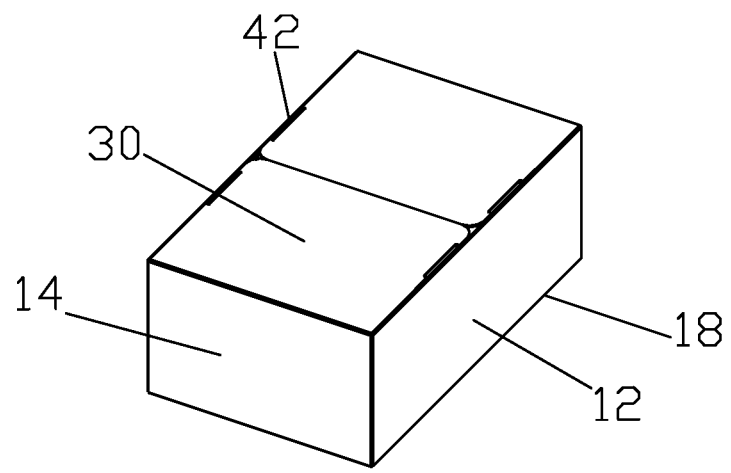
FIG. 5 is a completely closed plastic corrugated box.

A completely closed box is illustrated in FIG. 5 with both top flaps 30 folded down over fold lines 18 onto the top surface of the box.

As such, a reusable box can be seen in FIGS. 1-5 with a blank body operably configured to have an erected configuration. The erected configuration includes a bottom panel 10 forming a bottom wall of a reusable box and a first side panel 12 attached to the bottom panel 10. The first side panel 12 is folded about a fold line separating the first side panel 12 and the bottom panel 10 to form a first side wall of the reusable box that is erect relative to the bottom panel 10, has two opposing flaps 20 each unattached to the bottom panel 10 and that is each folded about a fold line separating the respective flap and the first side panel 12, and has a first upper flap 32 folded about a fold line separating the first upper flap 32 and the first side panel 12, unattached to the bottom panel 10, and defining two lock slots 42 thereon. The erected configuration also includes a second side panel 12 attached to the bottom panel 10 opposite the first side panel 12, that is folded about a fold line separating the second side panel 12 and the bottom panel 10 to form a second side wall of the reusable box that is erect relative to the bottom panel 10 and vertically opposing the first side wall, that has two opposing flaps 22 each unattached to the bottom panel 10 and each folded about a fold line separating the respective flap and the second side panel 12, and that has a second upper flap 32 folded about a fold line separating the second upper flap 32 and the second side panel 12, unattached to the bottom panel 10, and defining two lock slots 42 thereon. When in the erected configuration, one of the flaps 20 on the first side panel 12 is coupled with one of the flaps 20 on the second panel 12 by virtue of one of the flaps on the either the first or second side panels 12 having a projecting interlock tab 44 with a distal end inserted through a rear surface of the opposing flap and through an interlock slot 46 formed thereon, thereby having the distal end disposed on the front surface of the opposing flap of the opposing side panel to form a third side wall of the reusable box that is erect relative to the bottom panel 10. The same process is carried on the opposite side, whereby the other flap 20 on an opposite side is coupled with an opposing flap 20 by virtue of one of the flaps 20 having a projecting interlock tab 44 with a distal end inserted through a rear surface of the opposing flap and through an interlock slot 46 formed thereon, thereby having the distal end of said projecting interlock tab 44 disposed on the front surface of the opposing flap of the opposing side panel to form a fourth side wall of the reusable box that is erect relative to the bottom panel 10 and vertically opposing the third side wall. As discussed herein, the third and fourth side walls are formed by elasticity pulling back the interlocked flaps at opposite sides of the boxes, together with side panels and bottom panel 10. Additionally, the first side wall, second side wall, third side wall, and fourth side wall defining an enclosed space relative to the bottom wall and the first and second upper flaps 32 are folded over the enclosed space. The erected configuration also includes a third side panel 14 attached to the bottom panel 10, folded about a fold line separating the third side panel 14 and the bottom panel 10 and disposed behind the third side wall, that has a top flap 30 unattached to the bottom panel 10, folded about a fold line separating the third side panel 14 and the top flap 30 of the third side panel 14, and that is folded over the first and second upper flaps 32, and having a first lock tab 40 and a second lock tab 40 projecting from the top flap 30 and each respectively inserted within one of the two lock slots 42 on the first and second upper flaps 32. The erected configuration also includes a fourth side panel 14 attached to the bottom panel 10, folded about a fold line separating the fourth side panel 14 and the bottom panel 10 and disposed behind the fourth side wall, that has a top flap 30 unattached to the bottom panel 10, folded about a fold line separating the fourth side panel 14 and the top flap 30 of the fourth side panel 14, and folded over the first and second upper flaps 32, and that has a first lock tab 40 and a second lock tab 40 projecting from the top flap 30 of the fourth side panel 14 and each respectively inserted within one of the two lock slots 42 on the first and second upper flaps 32.

Advantages

1) The folding and interlock structures in the present invention are designed to build for box strength.
2) The plastic corrugated blanks in the present invention are designed for high speed die cut productions, minimizing costs.
3) The plastic blanks cut and creased for boxes in the present invention are in restricted shapes and areas that minimize cutaway areas, reducing costs on material waste.
4) Plastic corrugated panels provide cushioning protections to contents in the boxes.
5) Simply pushing side flaps all the way inward till interlock tabs pointing to interlock slots and interlock, folding elasticity pulls back the interlocked flaps at opposite sides of the boxes, together with side panels and bottom panel, an enclosure is built for loading before complete closing.
6) Interlocked flaps with locked tabs and slots stay alongside the vertical side panels without interrupting contents in the box.
7) The interlock and locking mechanism use frictions and engagement, mutually blocking upward move tendencies of side flaps, preventing self-opening.
8) Disassembly of the interlocks is simple by pushing interlocked flaps inward until withdrawing interlock tabs from interlock slots.
9) The designs in the present invention are based on symmetric principles, user friendly and packaging equipment friendly for continuous flow in fulfillment centers.
10) When an integral bottom panel is located at the center of the blank, it saves assembly work on the bottom panel itself unlike the auto bottom in other boxes.
11) The interlock designs in the present invention reduce multiple over layers on the plastic corrugated boxes, lessening the total weight.
12) Interlocked flaps are right under a top flap or top flaps, held in place and in reverse supporting the side panels alongside for stack load.
13) Designs in the present invention eliminate the flute openings facing upward, preventing contamination falling into flutes causing visual discomfort or problems.
14) All the boxes described in the present inventions are made in one piece folder without any accessories.
15) The flattened blanks in the present invention contain no dead spots along flutes, easily washed and dried out.

CONCLUSION, RAMIFICATIONS, AND SCOPE

Accordingly, the reader will see that the panel and flap interlocking and locking structures in the present invention for building reusable boxes are simple, convenient and practical. Substituting cardboard boxes with the reusable boxes can cut down carbon footprint, pollutions and preserve enormous amount of natural resources. It supplies sustainable, reusable and economical solutions of daily necessity to consumers, retailers, supply chains and eCommerce.

Although the description above contains much specificity, these should not be construed as limiting the scope of the embodiments but as merely providing illustrations of some of several embodiments. For instance, the box materials can extend to categories of cardboard, various types of polymers, composites or even metals, while the blanks can be made in single sheets instead of fluted panels. Regarding side flap interlocks on the opposite sides of the box, the interlock structures are not limited to the three interlock embodiments described in the present invention.

Top flaps for final box enclosure can be symmetrically identical from both sides as described in embodiments, or can be in forms of single top flap to cover across the whole top area, or top flaps of uneven sizes to cover the entire top area, or only partial top areas, or top flaps converted into sloped roof shapes or in other irregular shapes.

Lock tabs folded down from the top flaps to insert into lock slots embedded on the narrow flaps alongside the folding lines can apply to boxes beyond designs described in the present invention.

Even though embodiments in the present invention describe reusable plastic corrugated boxes, the design scope can extend to structures with similarities to those in the present invention. For instances, reusable plastic corrugated shelter homes carry double interlocked side flaps on one wall with roofs on the top. Others can be applied to play houses, pet houses, easily assembled furniture etc.

Accordingly what is claimed is:

1. A reusable box comprising:
    a blank body operably configured to have an erected configuration with:
        a bottom panel forming a bottom wall of a reusable box;
        a first side panel attached to the bottom panel, folded about a fold line separating the first side panel and the bottom panel to form a first side wall of the reusable box that is erect relative to the bottom panel, having two opposing flaps each unattached to the bottom panel, each having a front surface and a rear surface opposing the front surface of the flaps of the first side panel, and each folded about a fold line separating the respective flap and the first side panel, and having a first upper flap folded about a fold line separating the first upper flap and the first side panel, unattached to the bottom panel, and defining two lock slots thereon;
        a second side panel attached to the bottom panel opposite the first side panel, folded about a fold line separating the second side panel and the bottom panel to form a second side wall of the reusable box that is erect relative to the bottom panel and vertically opposing the first side wall, having two opposing flaps each unattached to the bottom panel, each having a front surface and a rear surface opposing the front surface of the flaps of the second side panel, and each folded about a fold line separating the respective flap and the second side panel, and having a second upper flap folded about a fold line separating the second upper flap and the second side panel, unattached to the bottom panel, and defining two lock slots thereon, wherein:
            one of the flaps on either the first or second side panels includes an interlock tab:
                projecting from a perimeter edge of said side panel and partially inserted through an enclosed interlock slot defined on the rear surface on an opposing flap of an opposing side panel;
                with convex edges spanning to and from the perimeter edge of said side panel from which the interlock tab projects from; and
                with a distal end disposed on the front surface of the opposing flap of the opposing side panel to form a third side wall of the reusable box that is erect relative to the bottom panel,
            one of the flaps on another of either the first or second side panels includes an interlock tab:
                projecting from a perimeter edge of said side panel and partially inserted through an enclosed interlock slot defined on the rear surface on an opposing flap of an opposing side panel;
                with convex edges spanning to and from the perimeter edge of said side panel from which the interlock tab projects from; and
                with a distal end disposed on the front surface of the opposing flap of the opposing side panel to form a fourth side wall of the reusable box that is erect relative to the bottom panel and vertically opposing the third side wall,
            the first side wall, second side wall, third side wall, and fourth side wall defining an enclosed space relative to the bottom wall, and
            the first and second upper flaps are folded over the enclosed space;
        a third side panel attached to the bottom panel, folded about a fold line separating the third side panel and the bottom panel and disposed behind the third side wall, having a top flap unattached to the bottom panel, folded about a fold line separating the third side panel and the top flap of the third side panel, and folded over the first and second upper flaps, and having a first lock tab and a second lock tab projecting from the top flap and each respectively inserted within one of the two lock slots on the first and second upper flaps; and
        a fourth side panel attached to the bottom panel, folded about a fold line separating the fourth side panel and the bottom panel and disposed behind the fourth side wall, having a top flap unattached to the bottom panel, folded about a fold line separating the fourth side panel and the top flap of the fourth side panel, and folded over the first and second upper flaps, and having a first lock tab and a second lock tab projecting from the top flap of the fourth side panel and each respectively inserted within one of the two lock slots on the first and second upper flaps.

2. The reusable box according to claim 1, wherein the blank body is made of a plastic material.

3. The reusable box according to claim 1, wherein the bottom panel is disposed in a center of the blank body.

4. The reusable box according to claim 1, wherein the first and second upper flaps continuously span along their respective fold line and each terminating on opposing sides at the first and second side wall, respectively, of the reusable box.

5. The reusable box according to claim 1, wherein the first and second upper flaps are symmetrically identical to one another.

6. The reusable box according to claim 1, wherein the two lock slots on the first and second upper flaps are enclosed.

7. The reusable box according to claim 1, wherein the first and second lock tabs of the top flap of the third side panel are each disposed on respective opposing side edges of the top flap of the third side panel and the first and second lock tabs of the top flap of the fourth side panel are each disposed on respective opposing side edges of the top flap of the fourth side panel.

8. The reusable box according to claim 1, wherein the two lock slots on the first upper flap are disposed directly adjacent to the fold line separating the first upper flap and the first side panel and the two lock slots on the second upper flap are disposed directly adjacent to the fold line separating the second upper flap and the second side panel.

\* \* \* \* \*